US006700338B2

(12) United States Patent
Sugimoto et al.

(10) Patent No.: US 6,700,338 B2
(45) Date of Patent: Mar. 2, 2004

(54) TUBULAR ACOUSTIC PRESSURE WAVE GENERATOR

(75) Inventors: Nobumasa Sugimoto, Suita (JP); Mitsuhiro Masuda, Moriguchi (JP)

(73) Assignee: Sanyo Electric Co., Ltd., Osaka (JP)

( * ) Notice: Subject to any disclaimer, the term of this patent is extended or adjusted under 35 U.S.C. 154(b) by 73 days.

(21) Appl. No.: 09/860,776

(22) Filed: May 21, 2001

(65) Prior Publication Data

US 2002/0048218 A1 Apr. 25, 2002

(30) Foreign Application Priority Data

May 22, 2000 (JP) ....................................... 2000-150447

(51) Int. Cl.[7] ................................................ H02K 33/00
(52) U.S. Cl. ........................................................ 318/114
(58) Field of Search .......................................... 318/114

(56) References Cited

U.S. PATENT DOCUMENTS 3,141,148 A * 7/1964 Hueter ........................ 367/153
3,237,421 A * 3/1966 Gifford ......................... 165/10
3,296,585 A * 1/1967 Trott ........................... 310/318
3,363,228 A * 1/1968 Massa ......................... 367/161
3,372,370 A * 3/1968 Cyr ............................. 367/159
3,432,000 A * 3/1969 Ongkiehong et al. ....... 367/155
3,559,162 A * 1/1971 Granfors et al. ............ 367/159
3,660,809 A * 5/1972 Pearson ....................... 367/152
4,072,871 A * 2/1978 Wilson ......................... 310/333
4,114,380 A * 9/1978 Ceperley ...................... 60/721
4,268,912 A * 5/1981 Congdon ..................... 367/163
4,355,517 A * 10/1982 Ceperley ...................... 60/721
4,398,398 A * 8/1983 Wheatley et al. ......... 62/467 R
4,546,459 A * 10/1985 Congdon ..................... 367/155
4,722,201 A * 2/1988 Hofler et al. ................. 62/467
4,858,441 A * 8/1989 Wheatley et al. ................ 62/6
4,890,687 A * 1/1990 Medlin et al. .............. 181/106
4,899,319 A * 2/1990 Medlin ......................... 367/35
4,903,249 A * 2/1990 Hoops et al. ............... 367/140
4,953,366 A * 9/1990 Swift et al. ................... 62/467
5,165,243 A * 11/1992 Bennett ........................... 62/6
5,303,555 A * 4/1994 Chrysler et al. ................. 62/6
5,526,690 A * 6/1996 Louie et al. .................. 73/592
5,647,216 A * 7/1997 Garrett ............................ 62/6
5,666,960 A * 9/1997 Fredberg et al. ............ 128/716
5,813,234 A * 9/1998 Wighard .......................... 62/6
5,901,556 A * 5/1999 Hofler ............................. 62/6
5,973,999 A * 10/1999 Naff et al. .................. 367/139
5,979,589 A * 11/1999 Aceti .......................... 181/135
6,233,946 B1 * 5/2001 Masuda ........................... 62/6
6,459,800 B1 * 10/2002 Brimhall ..................... 381/324

* cited by examiner

*Primary Examiner*—Thomas M. Dougherty
*Assistant Examiner*—Pedro J. Cuevas
(74) *Attorney, Agent, or Firm*—Armstrong, Kratz, Quintos, Hanson & Brooks, LLP

(57) ABSTRACT

A pressure wave generator comprises an acoustic tube 1, and a driving device 3 connected to one end of the tube for generating acoustic waves toward the interior of the tube 1. A plurality of Helmholtz resonators 2 each having a channel through which the cavity is connected with the interior of the acoustic tube 1 are arranged on the tubular wall of the acoustic tube 1 with suitable axial spacing. Each of the Helmholtz resonators 2 comprises a throat 21 having a narrower in diameter than the acoustic tube 1 and joined at a base end thereof to the tubular wall of the acoustic tube 1, and a cavity 22 joined at the one end of the throat 21 and having a suitable volume. The generator suppresses the generation of shock waves, and generates shock-free larger pressure amplitude than the ones conventionally achieved.

17 Claims, 8 Drawing Sheets

TUBULAR ACOUSTIC PRESSURE WAVE GENERATOR

FILED OF THE INVENTION

The present invention relates to a device for generating pressure variations of large amplitude in an acoustic tube without forming shock waves in the fluid contained in the acoustic tube.

BACKGROUND OF THE INVENTION

Already known as pressure wave generators in a gas fluid are acoustic compressors which comprise an acoustic tube with an inlet and an outlet for the fluid provided at one end thereof, and a driving device connected to the other end of the acoustic tube [see, for example, JP-A No. 11-303800 (1999), No. 8-219100(1996), No. 4-224279(1992), etc.]. The driving device produces pressure variations within the acoustic tube which cause the fluid to be discharged from the tube through the outlet while taking the fluid into the tube through the inlet. The fluid is compressed by a pressure difference between in the intake fluid and discharge fluid.

In the conventional acoustic compressors, however, shock waves generally appear as the pressure variations become large. This not only imposes limitations on the magnitude of amplitude of pressure variations in the fluid to limit the pressure difference between in the intake fluid and discharge fluid, i.e., the compression ratio of the fluid, but also causes heat generation in the fluid, and accordingly in the compressor itself, to a high temperature and producing loud noise.

SUMMARY OF THE INVENTION

An object of the present invention is to produce shock-free pressure variations of larger amplitude than the ones produced by conventional acoustic compressors or like pressure wave generators.

The present inventors previously made a theoretical analysis of the propagation of nonlinear acoustic waves in a tunnel provided with an array of Helmholtz resonators ("Propagation of nonlinear acoustic waves in a tunnel with an array of Helmholtz resonators," J. Fluid Mech. (1992), vol. 244, pp. 55–78). In consequence, the inventors found that the shock wave which emerges from the pressure waves generated by entry of a high-speed train into the tunnel can be effectively suppressed by a suitable array of Helmholtz resonators connected to the tunnel, as arranged axially thereof. The present inventors have conceived the idea of applying this theory to the suppression of shock waves in pressure wave generators, and substantiated the effect thereof to accomplish the present invention.

The present invention provides a pressure wave generator which comprises a closed acoustic tube 1, and a driving device 3 generating vibration mounted as directed toward the interior of the tube 1 at the resonance frequency of a fluid in the acoustic tube 1 or at a frequency close to the resonance frequency, a plurality of Helmholtz resonators 2 each having a channel which connects the cavity of the resonator with the interior of the acoustic tube 1 and being arranged on a periphery of a tubular wall of the acoustic tube 1 with suitable axial spacing (see FIG. 1).

Each of the Helmholtz resonators 2 comprises a throat 21 having a narrower channel in diameter than the acoustic tube 1 and joined at a base end thereof to the tubular wall of the acoustic tube 1, and a closed cavity of suitable volume 22 joined at one end of the throat.

As will be apparent from the experimental result to be described later, the pressure wave generator of the present invention produces the same effect (geometrical dispersion as will be described later) as that involved in the propagation of pressure waves in the tunnel provided with an array of Helmholtz resonators, whereby the generation of shock waves in the tunnel is suppressed.

Stated more specifically, the acoustic tube 1 connects thereto an intake pipe 13 and a discharge pipe 14, whereby an acoustic compressor is provided, in which the gas taken in through the intake tube 13 is compressed and discharged from the discharge pipe 14.

According to another specific embodiment, the acoustic tube 1 is in the form of a straight tube or loop, and a regenerator 41 in the form of stack of flat plates or a porous regenerator 44 disposed inside the acoustic tube 1, and the channel of the acoustic tube 1 is provided with a high-temperature heat exchanger 42 and a low-temperature heat exchanger 43 (see FIG. 8) connected respectively to the high-temperature end and the low-temperature end of the regenerator 41 or 44, whereby an acoustic refrigerator is provided to execute radiation and absorption of heat through the two heat exchangers 42, 43.

The Helmholtz resonators 2 can be replaced by a plurality of closed side-branch 2*a* from the acoustic tube 1 serving as the resonators (see FIG. 11). Usable as the driving device 3 in place of a linear motor is a device wherein a plate 32 as attached to bellows 31 is driven to reciprocate by a piezo-electric vibrator 35, or a device wherein a diaphragm 36 is driven instead of the bellows (see FIG. 10).

The pressure wave generator of the present invention has a simple construction wherein an array of cavities is arranged along an acoustic tube and by which generation of shock waves is effectively suppressed, generating a shock-free and larger pressure amplitude than the ones conventionally available entailing generation of shock waves.

DETAILED DESCRIPTION OF EMBODIMENTS

The present invention as embodied into acoustic compressors and acoustic refrigerators will be described below in detail with reference to the drawings.

First Embodiment

Figure 1:
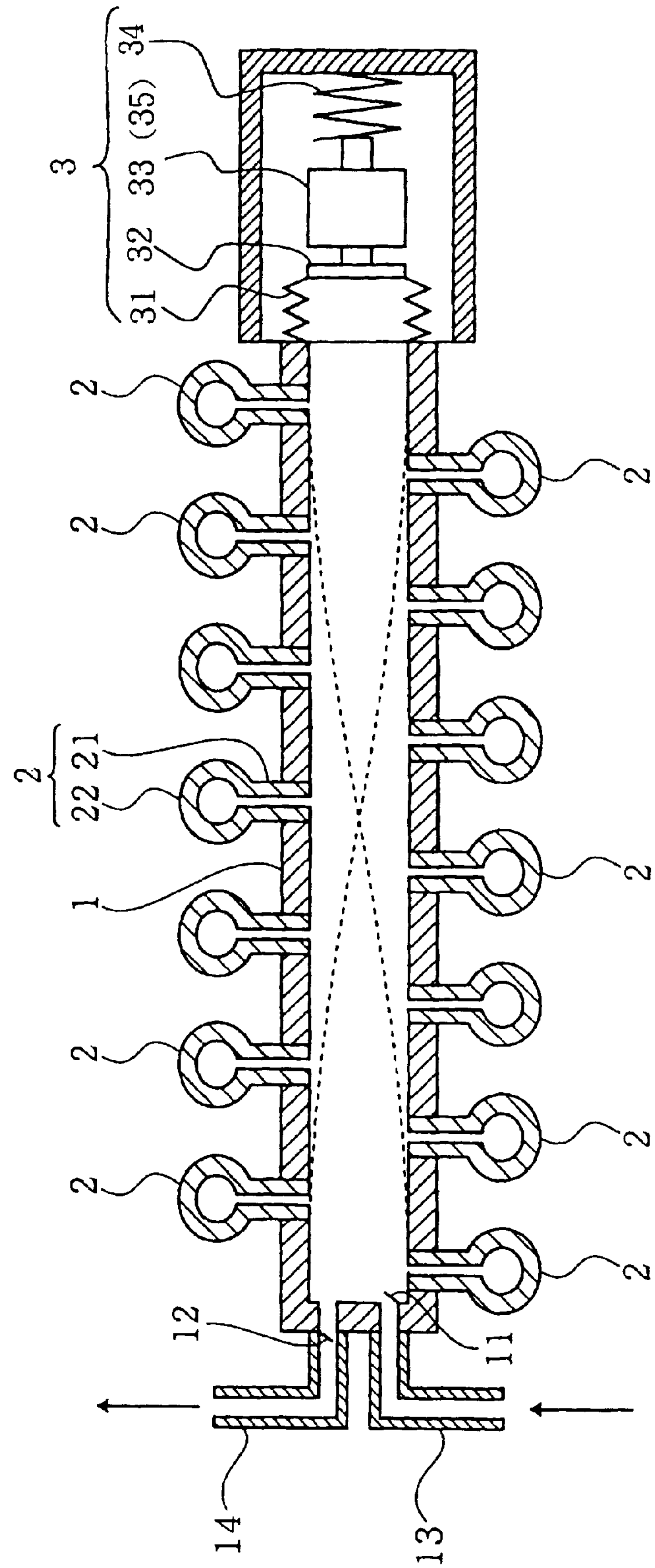
FIG. 1 is a view in section of an acoustic compressor as a first embodiment of the invention.

FIG. 1 shows this embodiment, i.e., an acoustic compressor, which comprises an acoustic tube 1 provided at one end thereof with a gas inlet and a gas outlet. An intake pipe 13 and a discharge pipe 14 are connected respectively to the inlet and the outlet, with check valves 11, 12 provided between the tube 1 and the pipes. The acoustic tube 1 is connected at the other end thereof to a driving device 3 for producing pressure variations in the tube 1.

The acoustic tube 1 is provided on the tubular wall thereof with a plurality of Helmholtz resonators 2 arranged at a suitable spacing axially of the tube and each having a channel through which the resonator is connected to the interior of the acoustic tube 1. Each of the Helmholtz resonators 2 comprises a throat 21 having a smaller diameter than the ones of the acoustic tube 1 and joined at a base end thereof to the tubular wall of the acoustic tube 1, and a closed cavity 22 joined at one end of the throat 21 and having a suitable volume.

The acoustic driving device 3 comprises bellows 31 attached to the above-mentioned other end of the acoustic tube 1, a vibration plate 32 attached to the outer end of the bellows 31, a linear motor 33 generating reciprocation of the plate 32, and a spring 34 for balancing an interia force working on the vibrating part of the linear motor 33.

The driving device 3 produces in the interior of the acoustic tube 1 pressure variations with a large amplitude having antinodes at opposite ends of the tube as indicated in broken lines. The pressure variations makes the gas discharge through the discharge pipe 14 while taking in gas through the intake pipe 13 to compress the gas with the pressure difference between in the intake gas and discharge gas.

With the acoustic compressor described, the pressure variations occurring inside the acoustic tube 1 are transmitted also to the inside of the Helmholtz resonators 2. Since the Helmholtz resonators 2 are arranged in an axial array along the acoustic tube 1, the resonators 2 respond differently to higher harmonic wave components produced by nonlinearity, i.e., the wave components having frequencies of multiples of the driving frequency, to give rise to geometrical dispersion to the pressure waves which would suppress the formation of shock waves.

Figure 2:
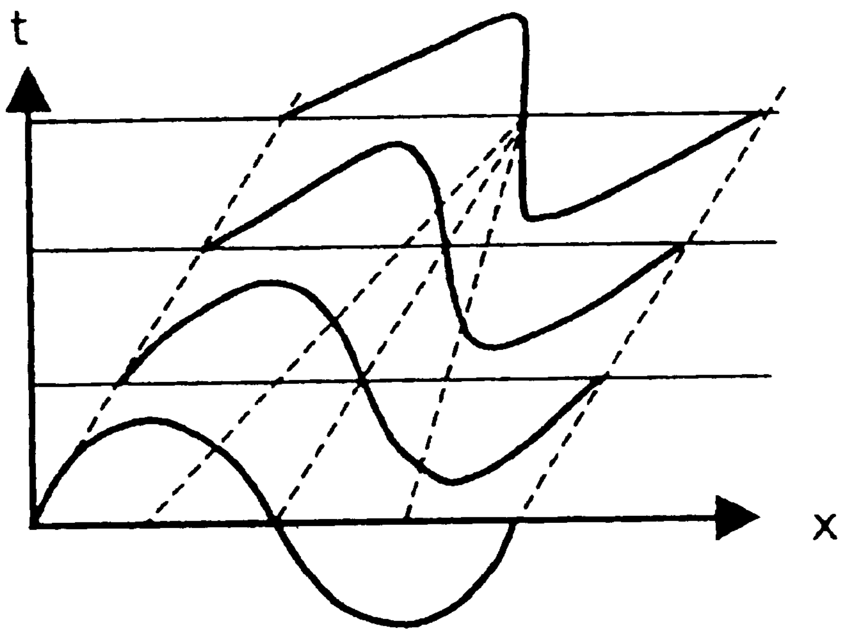
FIG. 2 is a diagram for illustrating the mechanism of generation of shock waves.

FIG. 2 illustrates the mechanism of formation of shock waves in a conventional acoustic tube. In the pressure wave, the portion of high pressure is higher than the portion of low pressure in the speed of propagation, so that the waveform which is initially sinusoidal deforms with time t to steepen as shown in FIG. 2. As a result, marked slope in pressure variations occurs to form shock waves.

Figure 3:
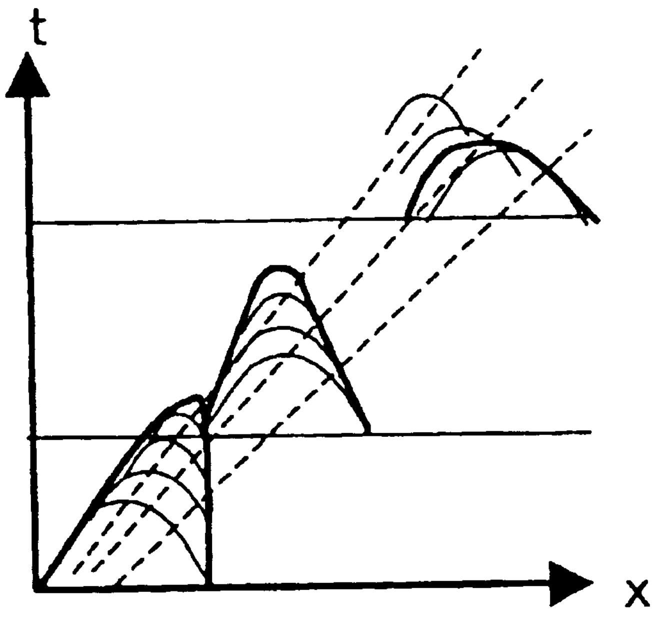
FIG. 3 is a diagram for illustrating the effect of the geometrical dispersion where the generation of shock waves is inhibited.

In the acoustic tube 1 of the present invention which is provided with Helmholtz resonators 2 arranged in an array, the resonators 2 respond differently to higher harmonic wave components which are different in frequency as mentioned above, so that these components become gradually dispersed with time t as illustrated in FIG. 3. Thus, the gas which has originally no dispersion in itself as a medium is given dispersion to avoid steepening of the pressure waveform, whereby the formation of shock waves is suppressed.

FIGS. 4 to 7 show an experimental result obtained to substantiate the effect in the acoustic compressor of the present invention. Used for the experiment was an acoustic tube 1 which was 3.2 m in length and 80 mm in inside diameter and which was provided with 64 Helmholtz resonators 2 which were 50 $cm^3$ in the volume of each cavity portion, 238 Hz in Helmholtz resonance frequency and 50 mm in axial spacing between the resonators 2. The driving device 3 was driven approximately at the resonance frequency of the acoustic tube 1 thereof and was so adjusted that the pressure variations (maximum-minimum) at the fixed end of the acoustic tube 1 were 15% of the atmospheric pressure. The resonance frequency was 53 Hz for the conventional acoustic tube having no Helmholtz resonators, or 48 Hz for the acoustic tube 1 of the invention provided with the array of Helmholtz resonators 2.

Figure 4:
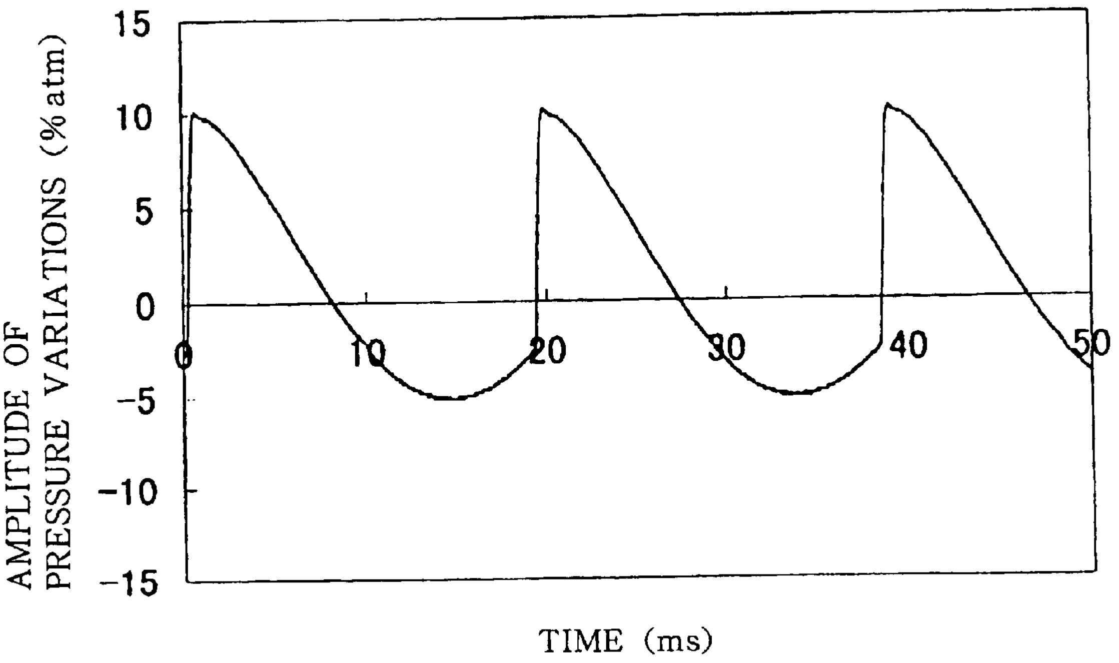
FIG. 4 PRIOR ART
FIG. 4 is a graph showing pressure variations at a fixed end of a conventional acoustic tube.
Figure 5:
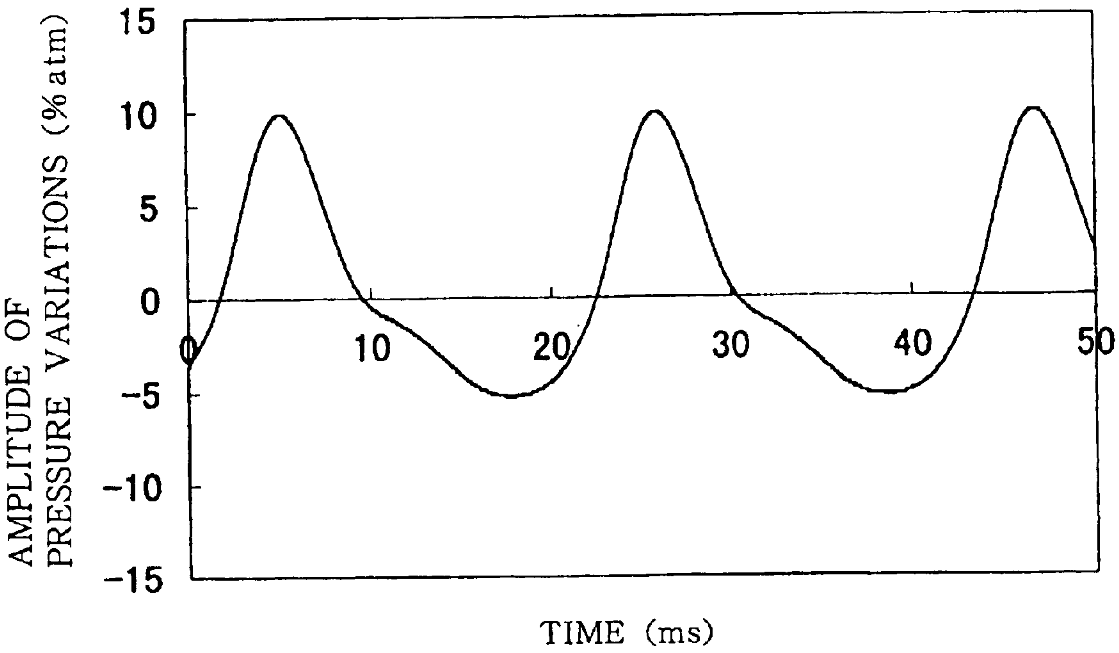
FIG. 5 is a graph showing pressure variations at a fixed end of an acoustic tube of the invention.

FIGS. 4 and 5 show the pressure variations at the fixed end (the end opposite to the driving device) of the acoustic tube, as determined for the conventional acoustic tube and the acoustic tube of the invention, respectively. Shock waves with a discontinuity in waveform were formed in the conventional acoustic tube having no Helmholtz resonators as seen in FIG. 4, whereas the acoustic tube of the invention provided with Helmholtz resonators produced a smooth waveform as shown in FIG. 5, obviously with no shock waves.

Figure 6:
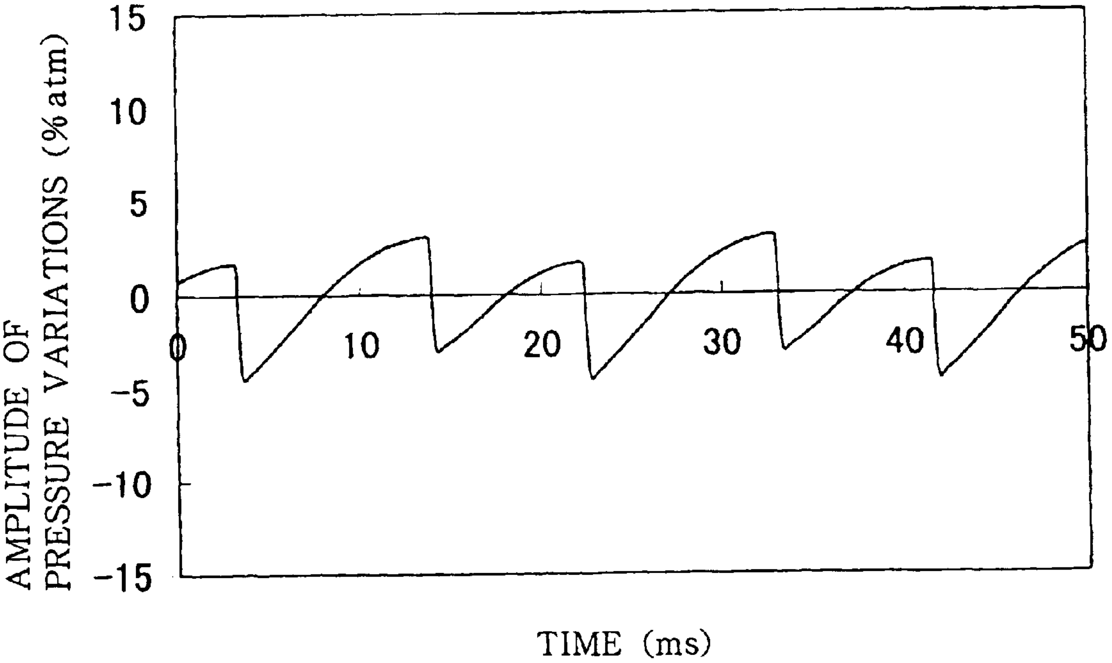
FIG. 6 PRIOR ART
FIG. 6 is a graph showing pressure variations at a position away from a driving device by a distance 7/16 of the length of the conventional acoustic tube.
Figure 7:
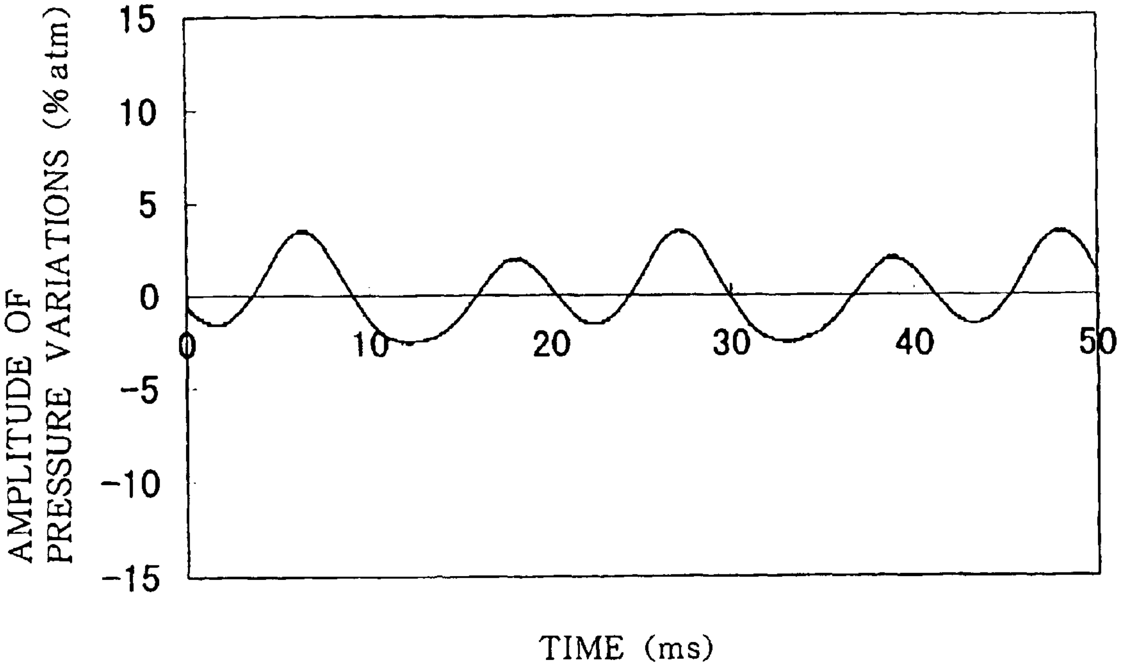
FIG. 7 is a graph showing pressure variations at a position away from a driving device by a distance 7/16 of the length of the acoustic tube of the invention.

FIGS. 6 and 7 show the pressure variations at a position away from the driving device by a distance 7/16 of the entire length of the acoustic tube, as determined for the conventional acoustic tube and the acoustic tube of the invention, respectively. Shock waves with a discontinuity in waveform were formed in the conventional acoustic tube having no Helmholtz resonators as seen in FIG. 6, whereas the acoustic tube of the invention provided with Helmholtz resonators produced a smooth-curved waveform as shown in FIG. 7, thus generating no shock waves.

With the acoustic compressor of the present invention, the acoustic tube 1 generates no shock waves therein, consequently achieving a high compression ratio even when a further increased pressure difference is given to the intake gas and the discharge gas. The compressor further eliminates noise and achieves a high energy efficiency.

Second Embodiment

Figure 8:
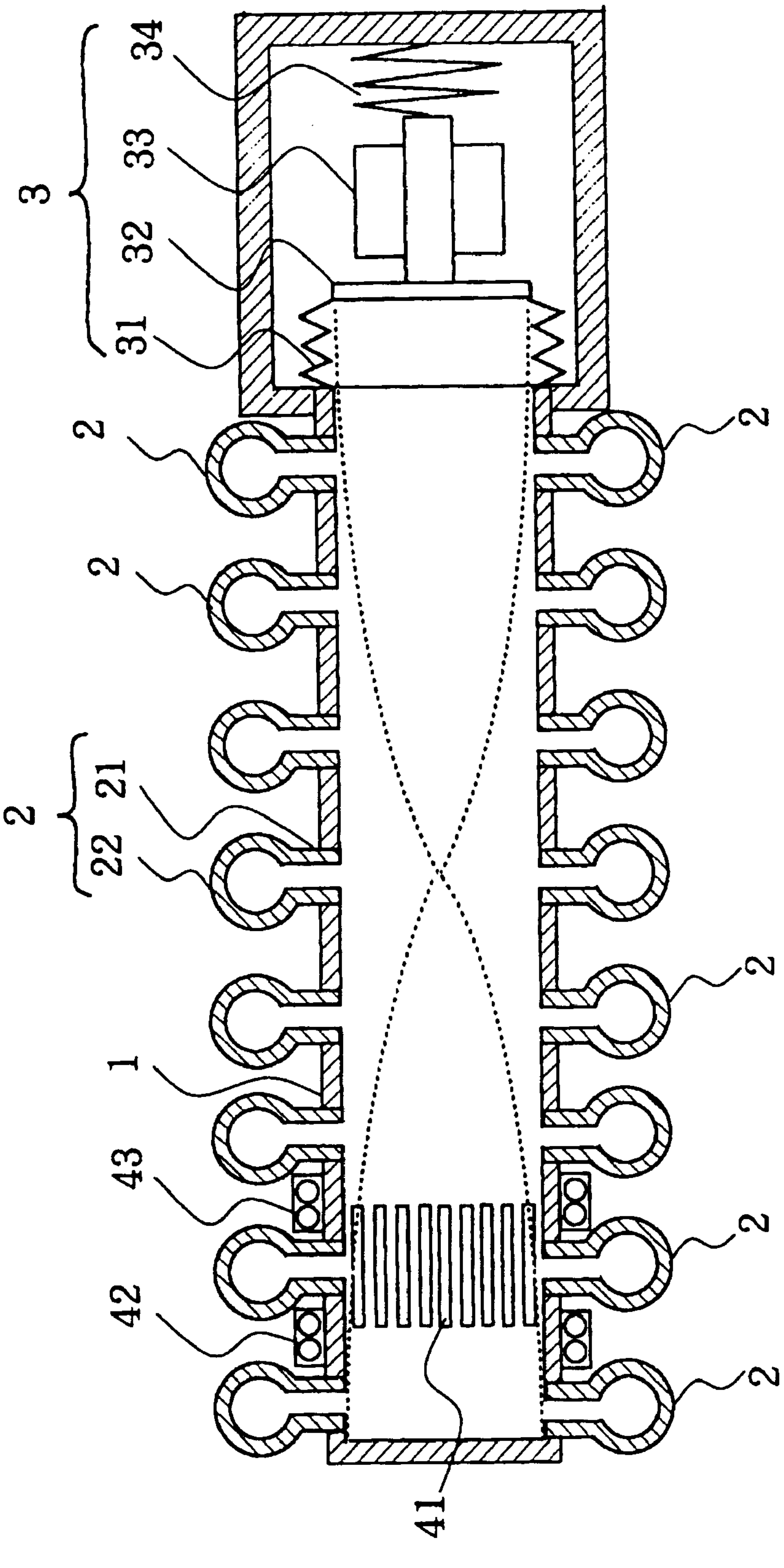
FIG. 8 is a sectional view of an acoustic refrigerator as a second embodiment of the invention.

FIG. 8 shows an acoustic refrigerator embodying the invention and comprising an acoustic tube 1, a regenerator 41 in the form of a stack of flat plates, and a high-temperature heat exchanger 42 and a low-temperature heat exchanger 43 provided around the acoustic tube 1 and connected respectively to both ends of the regenerator 41.

As in the first embodiment, the acoustic tube 1 is provided on the tubular wall thereof with a plurality of Helmholtz resonators 2 arranged at a suitable spacing axially of the tube and each having a channel through which the cavity is connected to the interior of the acoustic tube 1. Each of the Helmholtz resonators 2 comprises a throat 21 having a channel smaller in diameter than the acoustic tube 1 and joined at a base end thereof to the tubular wall of the acoustic tube 1, and a cavity 22 joined at one end of the throat 21 and having a suitable volume.

The driving device 3 comprises bellows 31 attached to the above-mentioned other end of the acoustic tube 1, a vibration plate 32 attached to the outer end of the bellows 31, a linear motor 33 generating reciprocation of the vibration plate 32, and a spring 34 for balancing an interia force working on the vibrating part of the linear motor 33.

The driving device 3 produces in the interior of the acoustic tube 1 pressure variations with a large amplitude having antinodes at both ends of the tube as indicated in broken lines. The pressure variations cause the regenerator 41 to absorb heat from the low-temperature heat exchanger 43 close to the node of pressure while causing the regenerator to release heat to the high-temperature heat exchanger 42 close to the antinode of pressure, whereby the object is cooled.

With the acoustic refrigerator described, the pressure variations occurring inside the acoustic tube 1 are transmitted also to the inside of the Helmholtz resonators 2, permitting the internal pressure variations of the acoustic tube 1 and those of the resonators 2 to mutually exert influence. Since the Helmholtz resonators 2 are arranged in an axial array along the acoustic tube 1, the resonators 2 respond differently to the higher harmonic wave components which have multiples of the driving frequency and included in pressure waves, consequently giving geometrical dispersion to the pressure waves which would otherwise produce shock waves to suppress the generation of shock waves.

Thus, without any shock waves generated in the interior of the acoustic tube 1, the acoustic refrigerator of the invention affords large pressure variations, consequently increasing refrigeration capacity afforded by a high pressure ratio. The refrigerator is free from noise, and a high energy efficiency can be achieved.

Figure 9:
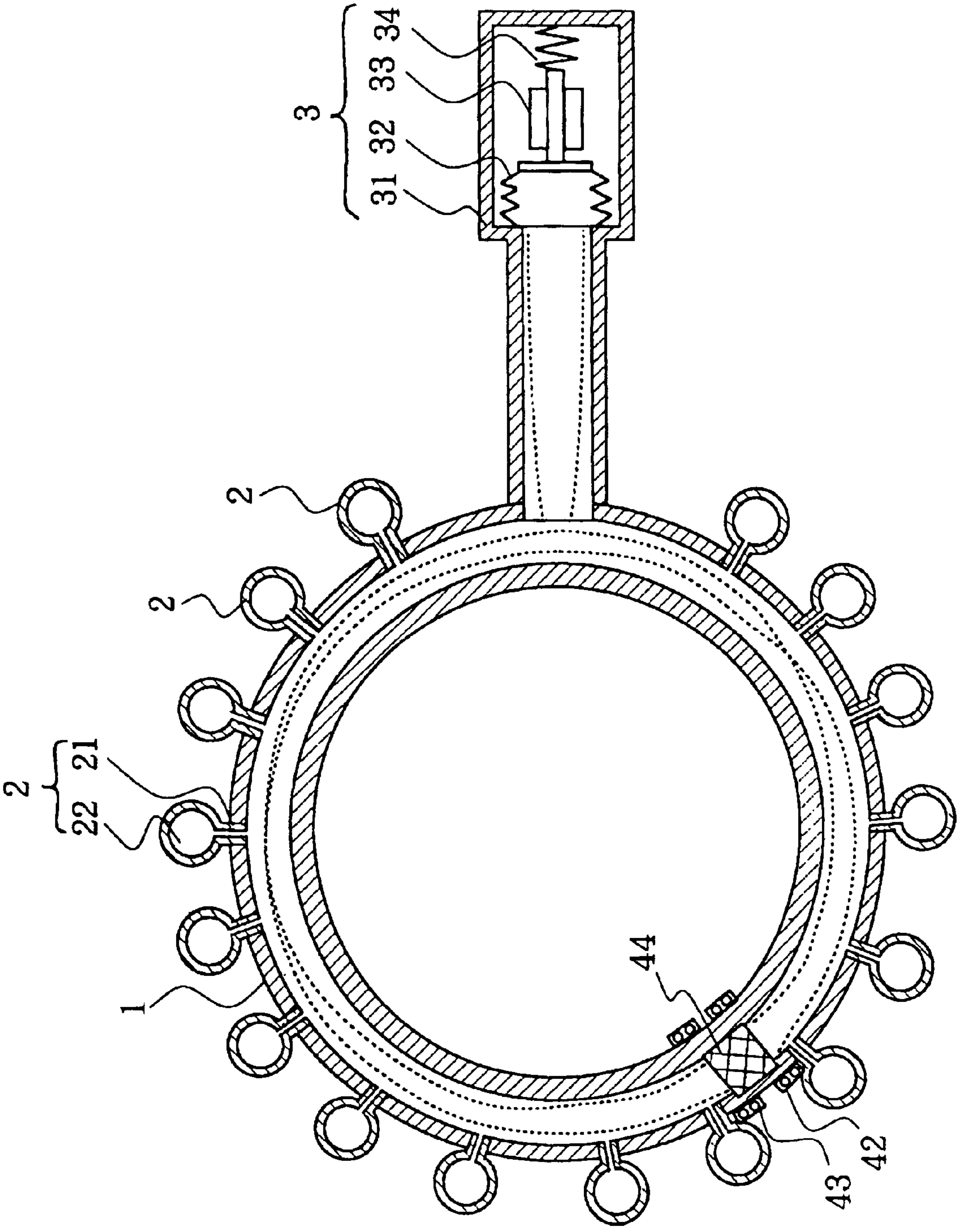
FIG. 9 is a sectional view showing another example of acoustic tube for use in the second embodiment.

The apparatus of the invention is not limited to the foregoing embodiments in construction but can be variously modified by one skilled in the art without departing from the spirit of the invention as set forth in the appended claims. For example, the acoustic tube 1 for use in the acoustic refrigerator is not limited to the straight tube shown in FIG. 8 but can be in the form of a loop as shown in FIG. 9. In this case, a porous regenerator 44 is disposed in the interior of the acoustic tube 1, with a driving device 3 connected to the acoustic tube 1. The acoustic refrigerator thus constructed of course has the same effect as the one in the refrigerator shown in FIG. 8.

Figure 11:
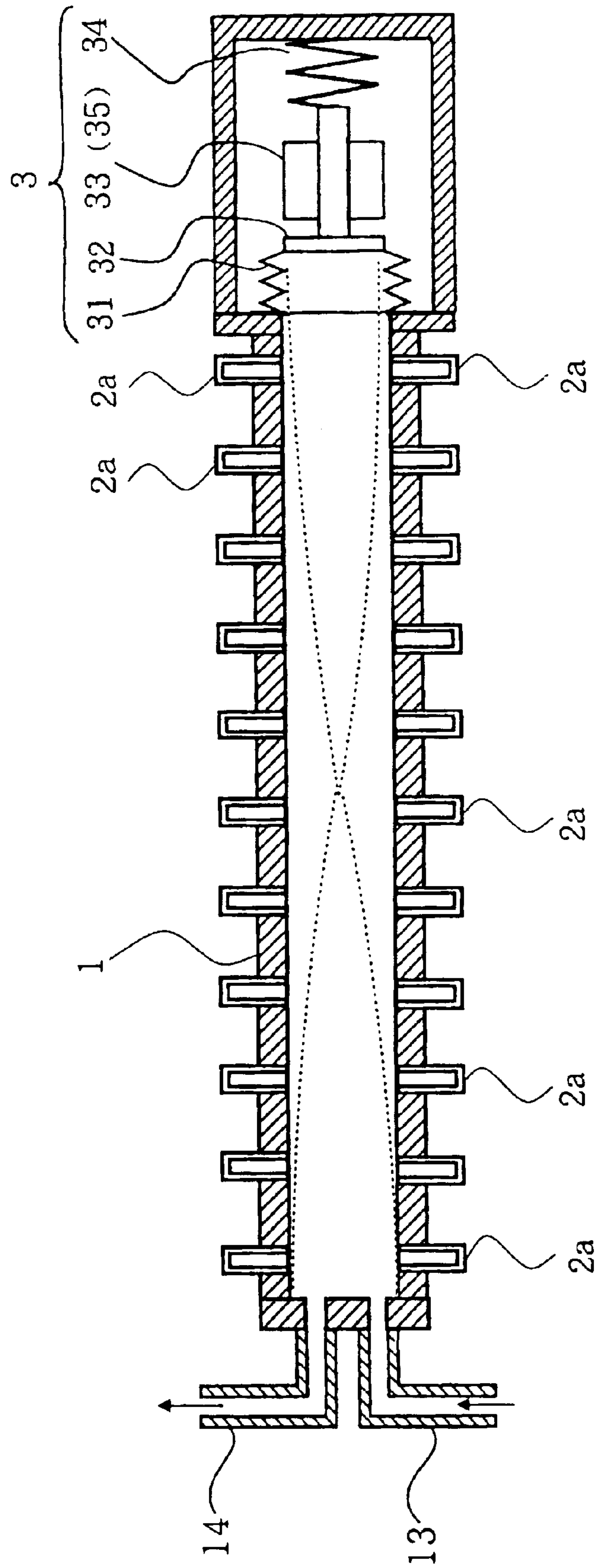
FIG. 11 is a sectional view of an acoustic compressor utilizing side-branches instead of resonators.

The Helmholtz resonators 2 for use in the acoustic compressor and acoustic refrigerator can be replaced by a plurality of closed cavities having a resonance frequency, e.g., side branches 2*a* as shown in FIG. 11, whereby the same effects as above can be obtained.

Figure 10:
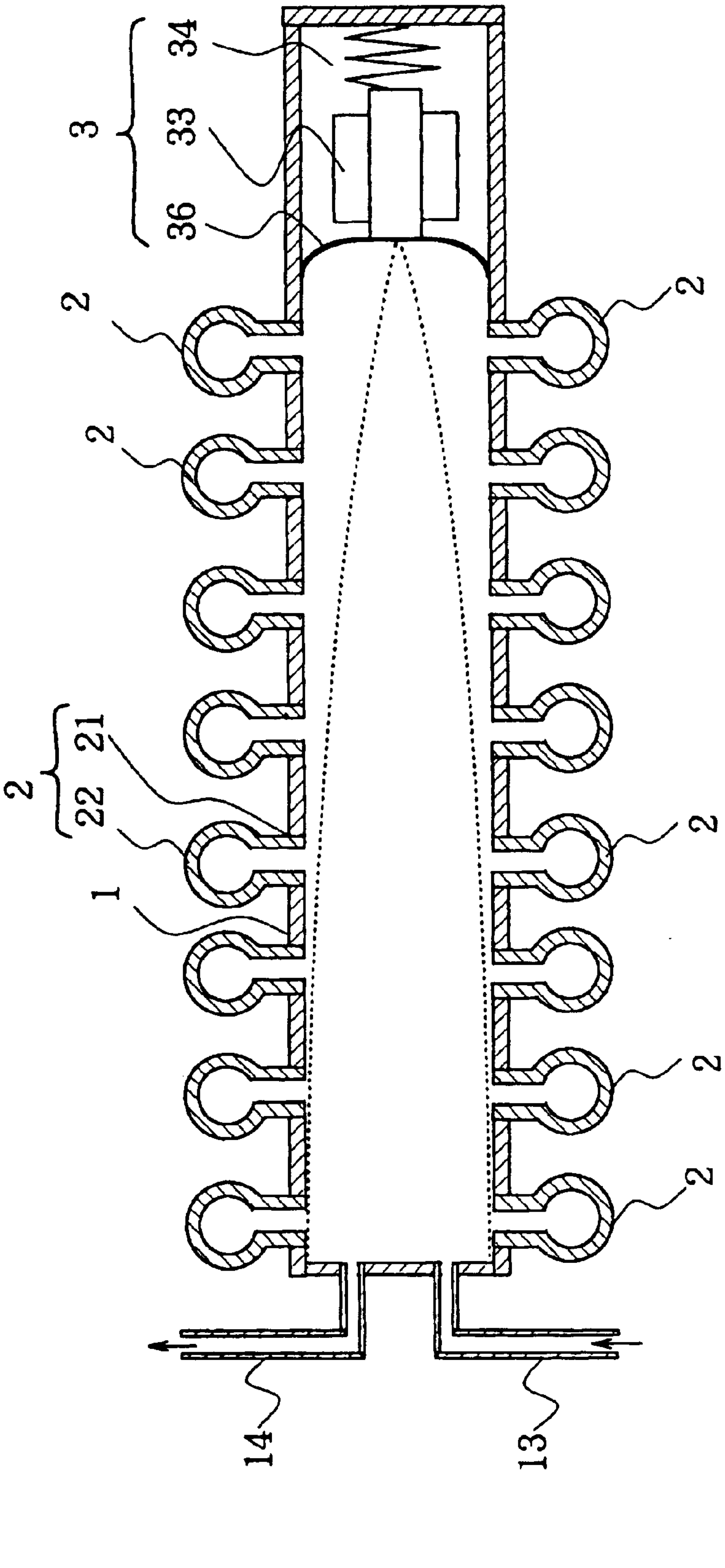
FIG. 10 is a sectional view showing a different example of acoustic driving device.

Further for use in the driving device 3, the linear motor 33 can be replaced by a piezoelectric vibrator 35, or a diaphragm 36, as shown in FIG. 10, driven reciprocatingly. The driving device 3 is then disposed close to the node of pressure of the acoustic tube 1 so as to give the acoustic tube 1 a length which is about ¼ of the wavelength of the pressure waves to be driven.

The pressure wave generator of the present invention is useful not only as a compressor for compressing a gas within a container connected to the discharge pipe 14, but also for a transport pump for transporting a gas with the pressure difference to be generated, or for a vacuum pump for evacuating a container connected to the intake pipe 13.

The Helmholtz resonators 2 are not only limited to those discretely arranged at a suitable spacing as seen in FIG. 1 but also can be such that a plurality of cavities are formed in the outer tubular wall of an acoustic tube 1 of double tube construction to provide an array of Helmholtz resonators. Further, the resonators can be arranged by lining the outer tubular wall of an acoustic tube 1.

Furthermore a heat engine which is the reverse cycle of the acoustic refrigerator utilizing the phenomenon of resonance can be realized utilizing the phenomenon of spontaneous gas oscillation similarly like the refrigerator by using the high-temperature heat exchanger 42 as a heat input device and the driving device 3 as a mechanical power output device.

What is claimed is:

1. A pressure wave generator comprising an acoustic tube, a driving device operable to vibrate at the resonance frequency of a fluid in the acoustic tube or at a frequency close to the resonance frequency, and a plurality of resonators each comprising a channel connecting with an interior of the acoustic tube and laterally intersecting with an interior side surface of the acoustic tube, the resonators being arranged on a periphery of a tubular wall of the acoustic tube with axial spacing therebetween.

2. A pressure wave generator according to claim 1 wherein an intake pipe and a discharge pipe are connected to the acoustic tube, and a gas taken in through the intake pipe is discharged from the discharge pipe.

3. A pressure wave generator according to claim 1 wherein a regenerator is disposed inside the acoustic tube, and the acoustic tube is provided therearound with a high-temperature heat exchanger and a low-temperature heat exchanger connected respectively to a high-temperature end of the regenerator and a low-temperature end thereof to execute radiation and absorption of beat through the two heat exchangers.

4. A pressure wave generator according to claim 3 wherein the acoustic tube is in the form of a loop, and the driving device is mounted at one end of the acoustic tube and connected to the channel of the acoustic tube.

5. A pressure wave generator according to claim 1, wherein at least one of the resonators comprises a respective cavity connected to the interior of the acoustic tube by the channel.

6. A pressure wave generator according to claim 1, wherein the channel extends generally radially outward from the periphery of the tubular wall of the acoustic tube.

7. A pressure wave generator according to claim 1, wherein the channel comprises a throat having a throat diameter narrower than a diameter of the acoustic tube.

8. A pressure wave generator according to claim 1, wherein at least one of the resonators comprises a closed side branch.

9. A pressure wave generator comprising an acoustic tube, a driving device operable to vibrate at the resonance frequency of a fluid in the acoustic tube or at a frequency close to the resonance frequency, and a plurality of Helmholtz resonators each comprising a channel connecting with an interior of the acoustic tube and laterally intersecting with an interior side surface of the acoustic tube, the resonators being arranged on a periphery of a tubular wall of the acoustic tube with axial spacing therebetween.

10. A pressure wave generator according to claim 9 wherein each of the Helmholtz resonators comprises a throat having a channel smaller in diameter than the acoustic tube and joined at a base end thereof to the tubular wall of the acoustic tube, and a closed cavity joined at one end of the throat and having a suitable volume.

11. A pressure wave generator according to claim 9 wherein an intake pipe and a discharge pipe are connected to the acoustic tube, and a gas taken in through the intake pipe is discharged from the discharge pipe.

12. A pressure wave generator according to claim 9 wherein a regenerator is disposed inside the acoustic tube, and a channel of the acoustic tube is provided therearound with a high-temperature heat exchanger and a low-temperature heat exchanger connected respectively to a high-temperature end of the regenerator and a low-temperature end thereof to execute radiation and absorption of heat and cooling through the two heat exchangers.

13. A pressure wave generator according to claim 12 wherein the acoustic tube is in the form of a loop, and the driving device is connected to the acoustic tube.

14. A pressure wave generator according to claim 9, wherein at least one of the resonators comprises a respective cavity connected to the interior of the acoustic tube by the channel.

15. A pressure wave generator according to claim 9, wherein the channel extends generally radially outward from the periphery of the tubular wall of the acoustic tube.

16. A pressure wave generator according to claim 9, wherein the channel comprises a throat having a throat diameter narrower than a diameter of the acoustic tube.

17. A pressure wave generator according to claim 9, wherein at least one of the resonators comprises a closed side branch.

* * * * *

UNITED STATES PATENT AND TRADEMARK OFFICE

CERTIFICATE OF CORRECTION

PATENT NO. : 6,700,338 B2
APPLICATION NO. : 09/860776
DATED : March 2, 2004
INVENTOR(S) : Sugimoto et al.

It is certified that error appears in the above-identified patent and that said Letters Patent is hereby corrected as shown below:

On the Title Page;
change item "[73] Sanyo Electric Co., Ltd., Osaka (JP)" to --Sanyo Electric Co., Ltd., Osaka (JP); Nobumasa Sugimoto, Osaka (JP)--

Signed and Sealed this

Eighth Day of January, 2008

JON W. DUDAS
*Director of the United States Patent and Trademark Office*